(12) United States Patent
Chen et al.

(10) Patent No.: US 12,119,850 B2
(45) Date of Patent: Oct. 15, 2024

(54) SPECTRAL MASKS AND SPECTRAL FLATNESS PARAMETERS FOR MILLIMETER WAVE (mmWave) CARRIER SIGNALS IN WIRELESS COMMUNICATION NETWORKS

(71) Applicant: QUALCOMM Incorporated, San Diego, CA (US)

(72) Inventors: Jialing Li Chen, San Diego, CA (US); Lin Yang, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 18/153,325

(22) Filed: Jan. 11, 2023

(65) Prior Publication Data

US 2024/0235582 A1    Jul. 11, 2024

(51) Int. Cl.
*H04B 1/04*        (2006.01)
(52) U.S. Cl.
CPC ....... *H04B 1/04* (2013.01); *H04B 2001/0491* (2013.01)
(58) Field of Classification Search
CPC ..... H03F 1/32; H03F 3/24; H03F 3/45; H03F 3/193; H04B 1/04; H04B 1/10; H04B 7/06; H04B 7/024; H04B 1/0456; H04B 17/345; H04B 2001/0491; H04L 5/00; H04L 25/03; H04L 27/00; H04L 27/26; H04L 27/36; H04W 4/00; H04W 52/36; H04W 52/52; H04W 72/04; H04W 76/14

USPC .......... 370/278, 441, 492; 375/219, 295–297
See application file for complete search history.

(56) References Cited

U.S. PATENT DOCUMENTS

| | | | |
|---|---|---|---|
| 9,660,345 B1* | 5/2017 | Gu | H04W 16/28 |
| 2013/0010848 A1* | 1/2013 | Shimizu | H04N 21/43637 |
| | | | 375/295 |
| 2016/0020933 A1* | 1/2016 | Rajagopal | H04L 27/0006 |
| | | | 370/329 |
| 2017/0063408 A1* | 3/2017 | Zamani | H04B 1/40 |

* cited by examiner

*Primary Examiner* — Shawkat M Ali
(74) *Attorney, Agent, or Firm* — Kevin M. Donnelly; Holland & Hart LLP

(57) ABSTRACT

This disclosure provides wireless communication methods, components, devices and systems for applying spectral masks and spectral flatness parameters in conjunction with transmission of millimeter wave (mmWave) signals in wireless communication networks. In some examples, in conjunction with transmission of an mmWave signal, a wireless communication device can apply a derivative spectral mask featuring transitional offset ranges that correspond to transitional frequency offset ranges of a spectral mask for a nominal carrier signal, scaled according to a ratio between a bandwidth of the mmWave signal and a bandwidth of the nominal carrier signal. In some examples, the derivative spectral mask can feature an in-band frequency offset range that is wider than a scaled width of an in-band frequency offset range of the spectral mask for the nominal carrier signal.

25 Claims, 6 Drawing Sheets

SPECTRAL MASKS AND SPECTRAL FLATNESS PARAMETERS FOR MILLIMETER WAVE (mmWave) CARRIER SIGNALS IN WIRELESS COMMUNICATION NETWORKS

TECHNICAL FIELD

This disclosure relates generally to wireless communication, and more specifically, to managing characteristics of transmissions at millimeter wave (mmWave) carrier frequencies in wireless communication networks.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). When transmitting on the shared wireless communication medium of a WLAN, a wireless communication device, such as a wireless AP or wireless STA, controls aspects of its transmissions to avoid or limit undue interference with other devices as well as to comply with various regulatory requirements. For example, such a wireless communication device may attenuate its emissions on outlying frequencies according to a spectral mask, and may control its transmissions to comply with applicable spectral flatness requirements.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device. The wireless communication device includes at least one memory and at least one processor communicatively coupled with the at least one memory, and the at least one processor is operable to cause the wireless communication device to modulate a millimeter-wave (mm-Wave) carrier signal according to a baseband signal to generate a modulated mmWave carrier signal of a first bandwidth ($\beta_1$), and transmit a radio frequency (RF) signal associated with the modulated mmWave carrier signal in accordance with a first spectral mask for the mmWave carrier signal of the first bandwidth ($\beta_1$). The first spectral mask defines an in-band frequency offset range and multiple transitional frequency offset ranges, including a respective transitional frequency offset range for each of multiple attenuation factors, where for each of the multiple attenuation factors, the respective transitional frequency offset range corresponds to a transitional frequency offset range for that attenuation factor associated with a second spectral mask for a nominal carrier signal of a second bandwidth ($\beta_2$) scaled according to a ratio $S_\beta$ between the first bandwidth ($\beta_1$) and the second bandwidth ($\beta_2$). A width of the in-band frequency offset range is wider than a width of an in-band frequency offset range of the second spectral mask for the nominal carrier signal scaled according to the ratio $S_\beta$.

Another innovative aspect of the subject matter described in this disclosure can be implemented in a method for wireless communication by a wireless communication device. The method includes modulating a millimeter-wave (mmWave) carrier signal according to a baseband signal to generate a modulated mmWave carrier signal of a first bandwidth ($\beta_1$), and transmitting a radio frequency (RF) signal associated with the modulated mm Wave carrier signal in accordance with a first spectral mask for the mmWave carrier signal of the first bandwidth ($\beta_1$). The first spectral mask defines an in-band frequency offset range and multiple transitional frequency offset ranges, including a respective transitional frequency offset range for each of multiple attenuation factors, where for each of the multiple attenuation factors, the respective transitional frequency offset range corresponds to a transitional frequency offset range for that attenuation factor associated with a second spectral mask for a nominal carrier signal of a second bandwidth ($\beta_2$) scaled according to a ratio $S_\beta$ between the first bandwidth ($\beta_1$) and the second bandwidth ($\beta_2$). A width of the in-band frequency offset range is wider than a width of an in-band frequency offset range of the second spectral mask for the nominal carrier signal scaled according to the ratio $S_\beta$.

In some examples of the methods and wireless communication devices, the second spectral mask is an Institute of Electrical and Electronics Engineers (IEEE) 802.11ad-compliant spectral mask.

In some examples of the methods and wireless communication devices, the first bandwidth ($\beta_1$) is approximately 160 MHz, approximately 320 MHz, approximately 480 MHz, approximately 640 MHz, or approximately 960 MHz.

In some examples of the methods and wireless communication devices, the second bandwidth ($\beta_2$) is approximately 2.16 GHZ.

In some examples, the methods and wireless communication devices may transmit the RF signal in accordance with a first data tone plan, where the first data tone plan defines a first set of data tones according to a second data tone plan for a second nominal carrier signal of a third bandwidth ($\beta_3$) and a ratio between the first bandwidth ($\beta_1$) and the third bandwidth ($\beta_3$).

In some examples of the methods and wireless communication devices, the first set of data tones corresponds to the second data tone plan upclocked by the ratio between the first bandwidth ($\beta_1$) and the third bandwidth ($\beta_3$).

In some examples, the methods and wireless communication devices may transmit the RF signal in accordance with spectral flatness parameters associated with the second data tone plan.

Details of one or more examples of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
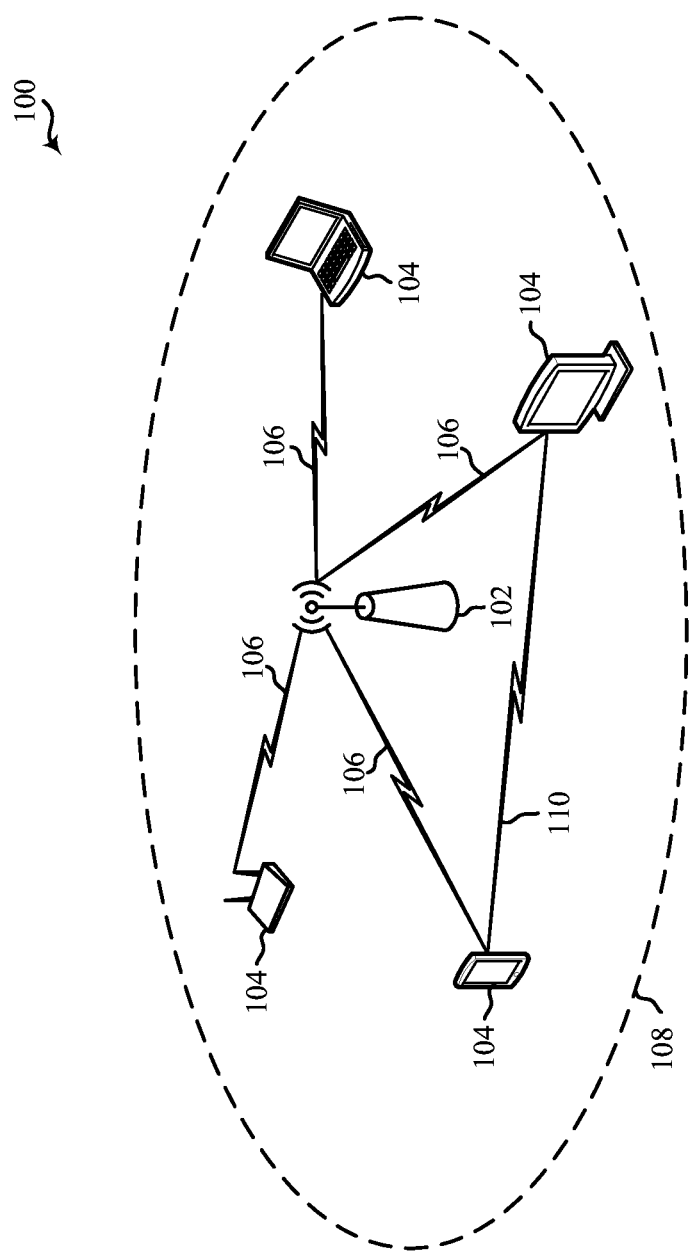
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication and more particularly to managing characteristics of transmissions at millimeter wave (mmWave) carrier frequencies in wireless communication networks. Some aspects more specifically relate to the application of spectral masks and spectral flatness parameters in conjunction with such transmissions. In some examples, a wireless communication device, such as a wireless station (STA) or wireless access point (AP), can apply, for a mmWave carrier signal, a derivative spectral mask that defines transitional frequency offset ranges that correspond to scaled transitional frequency offset ranges of a spectral mask for a nominal carrier signal. In some examples, the transitional frequency offset ranges of the spectral mask for the nominal carrier signal can be scaled according to a ratio between a bandwidth of the mmWave carrier signal and a bandwidth of the nominal carrier signal. In some examples, an enlarged in-band frequency offset range can be adopted for the derivative spectral mask that is wider than a scaled width of an in-band frequency offset range of the spectral mask for the nominal carrier signal. In some examples, the bandwidth of the nominal carrier signal can be approximately 2.16 GHz. In some examples, the spectral mask for the nominal carrier signal can be an IEEE 802.11ad-compliant spectral mask.

In some examples, the wireless communication device can apply, for the mmWave carrier signal, spectral flatness parameters associated with a data tone plan for the mmWave carrier signal. In some examples, the data tone plan for the mmWave carrier signal can be a derivative data tone plan that defines a set of data tones according to a data tone plan for a second nominal carrier signal and a ratio between the bandwidth of the mmWave carrier signal and a bandwidth of the second nominal carrier signal. In some examples, the derivative data tone plan can define the set of data tones of the mmWave carrier signal to correspond to a set of data tones defined by the data tone plan for the second nominal carrier, upclocked by the ratio between the bandwidth of the mmWave carrier signal and the bandwidth of the second nominal carrier signal. In some examples, spectral flatness parameters associated with the data tone plan for the second nominal carrier signal can be used as the spectral flatness parameters applied for the mmWave carrier signal.

Particular aspects of the subject matter described in this disclosure can be implemented to realize one or more of the following potential advantages. In some examples, aspects of the RF design process for the wireless communication device can be streamlined if the wireless communication device is configured to implement derivative spectral masks, as can aspects of RF processing at the wireless communication device. In some examples, adopting enlarged in-band frequency offset ranges for the derivative spectral masks can prevent or mitigate attenuation of outer tones that may otherwise occur in conjunction with transmissions of the wireless communication device using the associated mm Wave carriers. In some examples, adopting such enlarged in-band frequency offset ranges can allow higher bandwidth efficiency with respect to use of the wireless medium, and can support increased levels of throughput. In some examples, adoption of derivative data tone plans can also enable streamlining of aspects of RF design and RF processing, as can the use of spectral flatness parameters associated with the data tone plans based on which those derivative data tone plans are derived.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IOT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHZ bands, each of which is divided into multiple 20 MHz channels. As such, these PPDUs are transmitted over a physical channel having a minimum bandwidth of 20 MHZ, but larger channels can be formed through channel bonding. For example, PPDUs may be transmitted over physical channels having bandwidths of 40 MHZ, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

In some wireless communications environments, Extremely High Throughput (EHT) systems or other systems compliant with future generations of the IEEE 802.11 family of wireless communication protocol standards may provide additional capabilities over other previous systems (for example, High Efficiency (HE) systems or other legacy systems). EHT and newer wireless communication protocols may support flexible operating bandwidth enhancements at APs and STAs, such as broadened operating bandwidths relative to legacy operating bandwidths or more granular operation relative to legacy operation. For example, an EHT system may allow communications spanning operating bandwidths of 20 MHZ, 40 MHZ, 80 MHZ, 160 MHz, 240 MHz and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device operates in a contiguous 320 MHz bandwidth mode or a 160+160 MHz bandwidth mode. Signals for transmission may be generated by two different transmit chains of the device each having a bandwidth of 160 MHZ (and each coupled to a different power amplifier). In some other examples, signals for transmission may be generated by four or more different transmit chains of the device, each having a bandwidth of 80 MHZ.

In some other examples, the wireless communication device may operate in a contiguous 240 MHz bandwidth mode, or a noncontiguous 160+80 MHz bandwidth mode. In some examples, the signals for transmission may be generated by three different transmit chains of the device, each having a bandwidth of 80 MHZ. In some other examples, the 240 MHz/160+80 MHz bandwidth modes may also be formed by puncturing 320/160+160 MHz bandwidth modes with one or more 80 MHZ subchannels. For example, signals for transmission may be generated by two different transmit chains of the device each having a bandwidth of 160 MHz with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band or noncontiguous and located in different bands (such as partly in the 5 GHZ band and partly in the 6 GHz band).

In some examples, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

Figure 2:
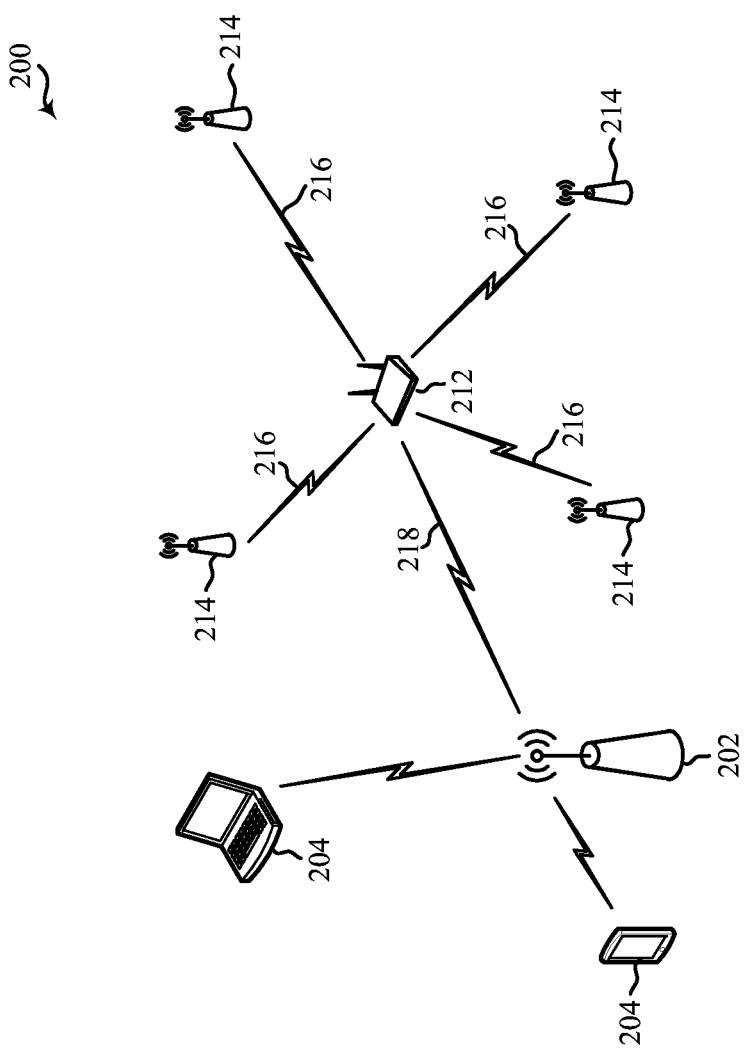
FIG. 2 shows a pictorial diagram of another example wireless communication network.

FIG. 2 shows a pictorial diagram of another example wireless communication network 200. According to some aspects, the wireless communication network 200 can be an example of a mesh network, an IoT network or a sensor network in accordance with one or more of the IEEE 802.11 family of wireless communication protocol standards (including the 802.11ah amendment). The wireless network 200 may include multiple wireless communication devices 214. The wireless communication devices 214 may represent various devices such as display devices (for example, TVs, computer monitors, navigation systems, among others), music or other audio or stereo devices, remote control devices ("remotes"), printers, kitchen or other household appliances, among other examples.

In some examples, the wireless communication devices 214 sense, measure, collect or otherwise obtain and process data and then transmit such raw or processed data to an intermediate device 212 for subsequent processing or distribution. Additionally or alternatively, the intermediate device 212 may transmit control information, digital content (for example, audio or video data), configuration information or other instructions to the wireless communication devices 214. The intermediate device 212 and the wireless communication devices 214 can communicate with one another via wireless communication links 216. In some examples, the wireless communication links 216 include Bluetooth links or other PAN or short-range communication links.

In some examples, the intermediate device 212 also may be configured for wireless communication with other networks such as with a Wi-Fi WLAN or a wireless (for example, cellular) wide area network (WWAN), which may, in turn, provide access to external networks including the Internet. For example, the intermediate device 212 may associate and communicate, over a Wi-Fi link 218, with an AP 202 of a WLAN network, which also may serve various wireless STAs 204. In some examples, the intermediate device 212 is an example of a network gateway, for example, an IoT gateway. In such a manner, the intermediate device 212 may serve as an edge network bridge providing a Wi-Fi core backhaul for the IoT network including the wireless communication devices 214. In some examples, the intermediate device 212 can analyze, preprocess and aggregate data received from the wireless communication devices 214 locally at the edge before transmitting it to other devices or external networks via the Wi-Fi link 218. The intermediate device 212 also can provide additional security for the IoT network and the data it transports.

Figure 3:
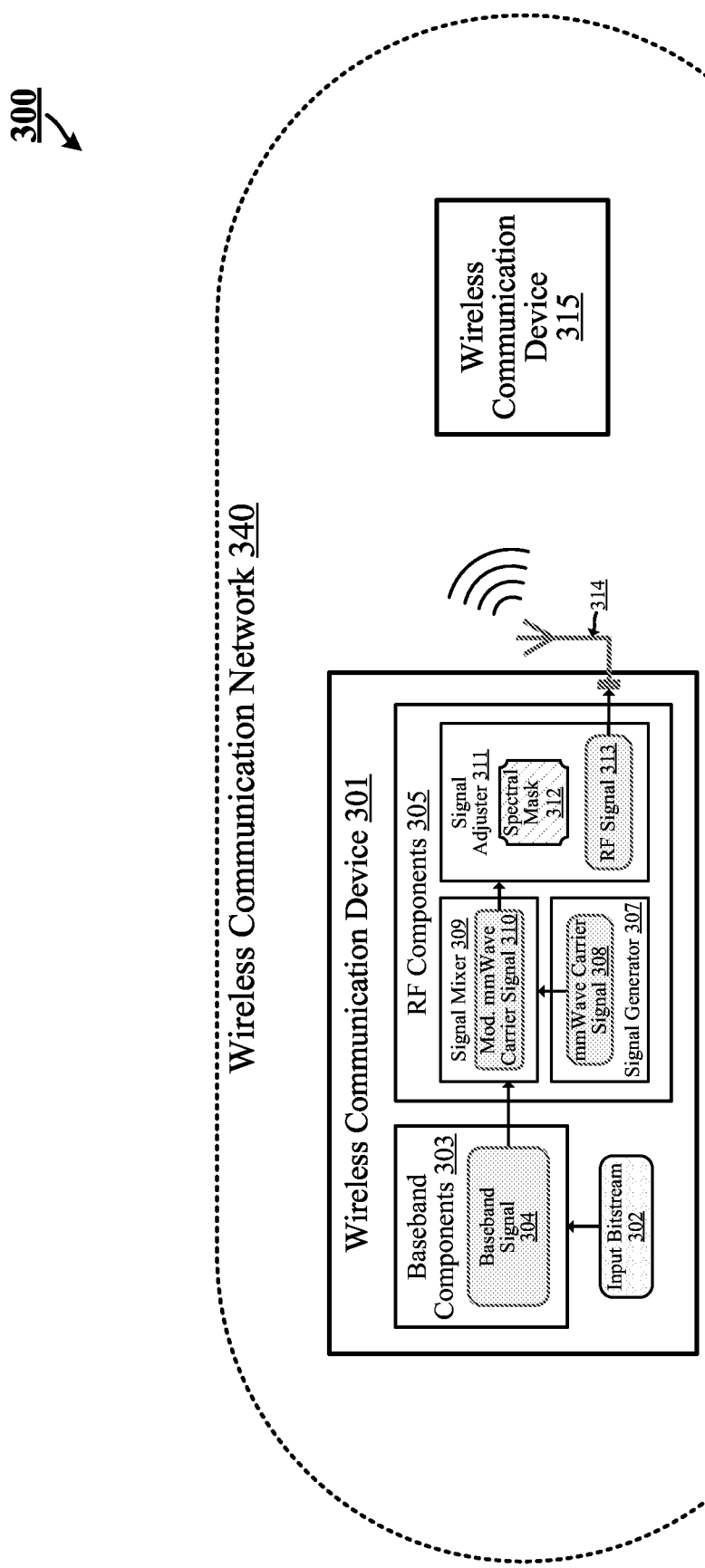
FIG. 3 shows a block diagram of an example operating environment.

FIG. 3 shows a block diagram of an example operating environment 300. In the operating environment 300, a wireless communication device 301 in a wireless communication network 340 transmits a radio frequency (RF) signal 313 to a wireless communication device 315 in the wireless communication network 340. The wireless communication network 340 can be a WLAN in which devices such as the wireless communication device 301 and the wireless communication device 315 wirelessly communicate according to protocols and procedures defined in the IEEE 802.11 family of wireless communication standards. In some examples, the wireless communication device 301 can operate as or within a wireless AP such as the wireless AP 102 described with reference to FIG. 1 or the wireless AP 202 described with reference to FIG. 2. In some other examples, the wireless communication device 301 can operate as or within a wireless STA such as one of the wireless STAs 104 described with reference to FIG. 1 or one of the wireless STAs 204 described with reference to FIG. 2.

The wireless communication device 301 includes baseband components 303. RF components 305, and an RF antenna 314. The baseband components can include, for instance, a baseband processor. The baseband components 303 can generate baseband signals based on bit streams included in received input signals. Based on baseband signals provided by the baseband components 303, the RF components 305 can generate RF signals for transmission to other devices in the wireless communication network 340. The RF components 305 can include a signal generator 307, a signal mixer 309, and a signal adjuster 311. The signal generator 307 can generate RF carrier signals, which the signal mixer 309 can mix with baseband signals received from the baseband components 303 to create modulated RF carrier signals. The signal adjuster 311 can apply various types of adjustments to such modulated RF carrier signals to create RF signals that the wireless communication device 301 can transmit to other devices in the wireless communication network 340 using the RF antenna 314.

Some adjustments that the signal adjuster 311 applies to modulated RF carrier signals in the operating environment 300 can correspond to the application of spectral masks. Such spectral masks can generally represent schemes for attenuating emissions associated with transmission of RF signals by the wireless communication device 301. Any given spectral mask can define an attenuation function $a(\beta, \Delta_f)$, the value of which can represent a specified attenuation magnitude associated with a frequency offset of $\Delta_f$ relative to a center frequency $f_c$ of an RF signal of bandwidth $\beta$. The spectral mask can define values of $a(\beta, \Delta_f)$ over a range of possible values of the frequency offset $\Delta_f$. For a given value of the frequency offset $\Delta_f$, the value of $a(\beta, \Delta_f)$ can represent a magnitude by which emissions are to be attenuated on a frequency $f_a$ that is equal to $f_c + \Delta_f$.

Figure 4A:
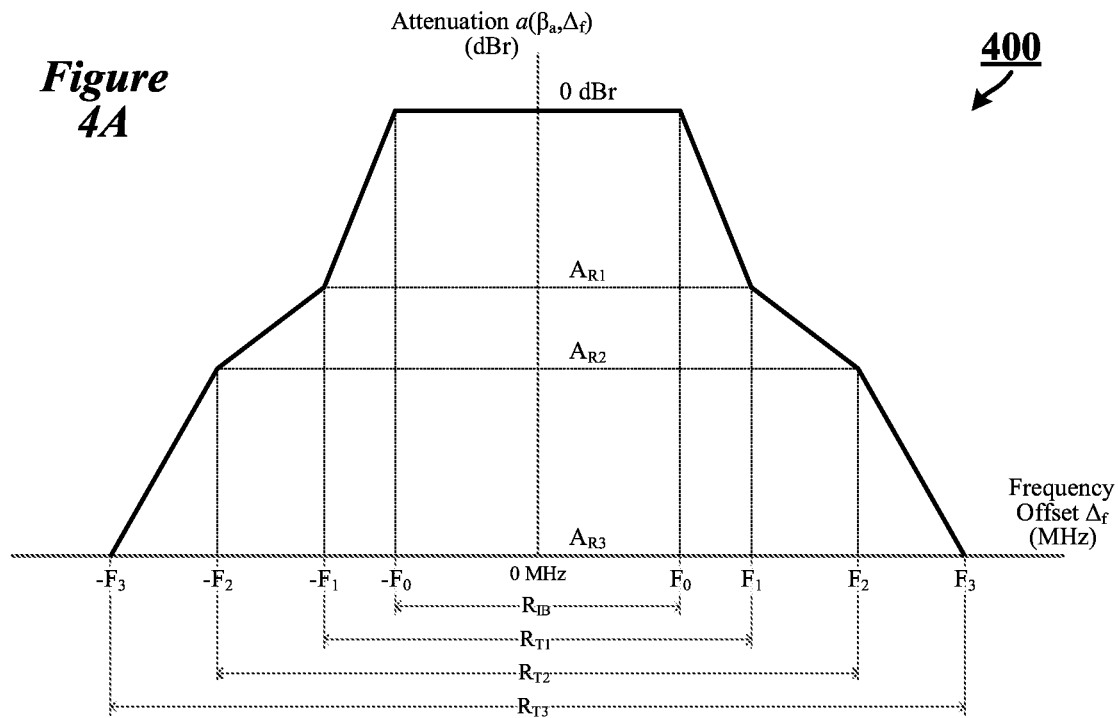
FIG. 4A illustrates a first example spectral mask structure.

FIG. 4A illustrates a first example spectral mask structure 400. The spectral mask structure 400 represents a spectral mask for RF transmissions of a bandwidth $\beta_a$. According to the spectral mask structure 400, from a frequency offset value $-F_0$ to a frequency offset value $F_0$, the value of $a(\beta_a, \Delta_f)$ is 0 dBr, indicating that emissions on frequencies corresponding to frequency offset values from $-F_0$ to $F_0$ are not to be attenuated. The frequency offset values $-F_0$ and $F_0$ correspond to inflection points with respect to the attenuation function $a(\beta_a, \Delta_f)$, since the value of $a(\beta_a, \Delta_f)$ begins to decrease linearly with $\Delta_f$ as $|\Delta_f|$ exceeds $F_0$. An in-band frequency offset range $R_{IB}$ of the spectral mask structure 400, representing a range of frequency offset values for which the value of $a(\beta_a, \Delta_f)$ is 0 dBr, spans between frequency offset values $-F_0$ and $F_0$. The slope of the attenuation function $a(\beta_a, \Delta_f)$ within the in-band frequency offset range $R_{IB}$ is 0.

Transitional frequency offset ranges $R_{T1}$, $R_{T2}$, and $R_{T3}$ of the spectral mask structure 400 span between other pairs of frequency offset values that correspond to inflection points with respect to the attenuation function $a(\beta_a, \Delta_f)$. Respective attenuation factors $A_{R1}$, $A_{R2}$, and $A_{R3}$ represent the values of $a(\beta_a, \Delta_f)$ at the endpoints of the transitional frequency offset ranges $R_{T1}$, $R_{T2}$, and $R_{T3}$. As the frequency offset $\Delta_f$ increases from $F_0$ to $F_1$ (or decreases from $-F_0$ to $-F_1$), the value of $a(\beta_a, \Delta_f)$ decreases linearly from 0 to $A_{R1}$. As the frequency offset $\Delta_f$ increases from $F_1$ to $F_2$ (or decreases from $-F_1$ to $-F_2$), the value of $a(\beta_a, \Delta_f)$ decreases linearly from $A_{R1}$ to $A_{R2}$. As the frequency offset $\Delta_f$ increases from $F_2$ to $F_3$ (or decreases from $-F_2$ to $-F_3$), the value of $a(\beta_a, \Delta_f)$ decreases linearly from $A_{R2}$ to $A_{R3}$.

In the example operating environment 300 of FIG. 3, the baseband components 303 can generate a baseband signal 304 based on a received input bitstream 302. The input bitstream 302 can include, for instance, bits associated with a PPDU to be transmitted to the wireless communication device 315. The signal generator 307 can generate a mmWave carrier signal 308, which the signal mixer 309 can mix with the baseband signal 304 to obtain a modulated mmWave carrier signal 310. According to various examples, a center frequency of the mmWave carrier signal 308 can be a frequency in a 60 GHz frequency band or a 45 GHz frequency band. The signal adjuster 311 can adjust the modulated mmWave carrier signal 310 to create an RF signal 313 that the wireless communication device 301 can transmit to the wireless communication device 315 using the RF antenna 314.

The adjustment of the modulated mmWave carrier signal 310 that the signal adjuster 311 performs to create the RF signal 313 can include applying a spectral mask 312. In some examples, the spectral mask 312 can be a spectral mask that defines transitional frequency offset ranges that correspond to scaled transitional frequency offset ranges of a second spectral mask (such a spectral mask 312 may be referred to herein as a "derivative spectral mask"). In some examples, the second spectral mask can be a spectral mask for a first nominal carrier signal of a different bandwidth than the RF signal 313. In some examples, the transitional frequency offset ranges of the second spectral mask can be scaled according to a ratio $S_\beta$ between the bandwidth of the RF signal 313 and the bandwidth of the first nominal carrier signal. In some examples, the spectral mask 312 can feature an enlarged in-band frequency offset range that is wider than a scaled width of an in-band frequency offset range of the second spectral mask. In some examples, the second spectral mask can be an IEEE 802.11ad-compliant spectral mask. In some examples, the first nominal carrier signal may have a bandwidth of approximately 2.16 GHz.

Figure 4B:
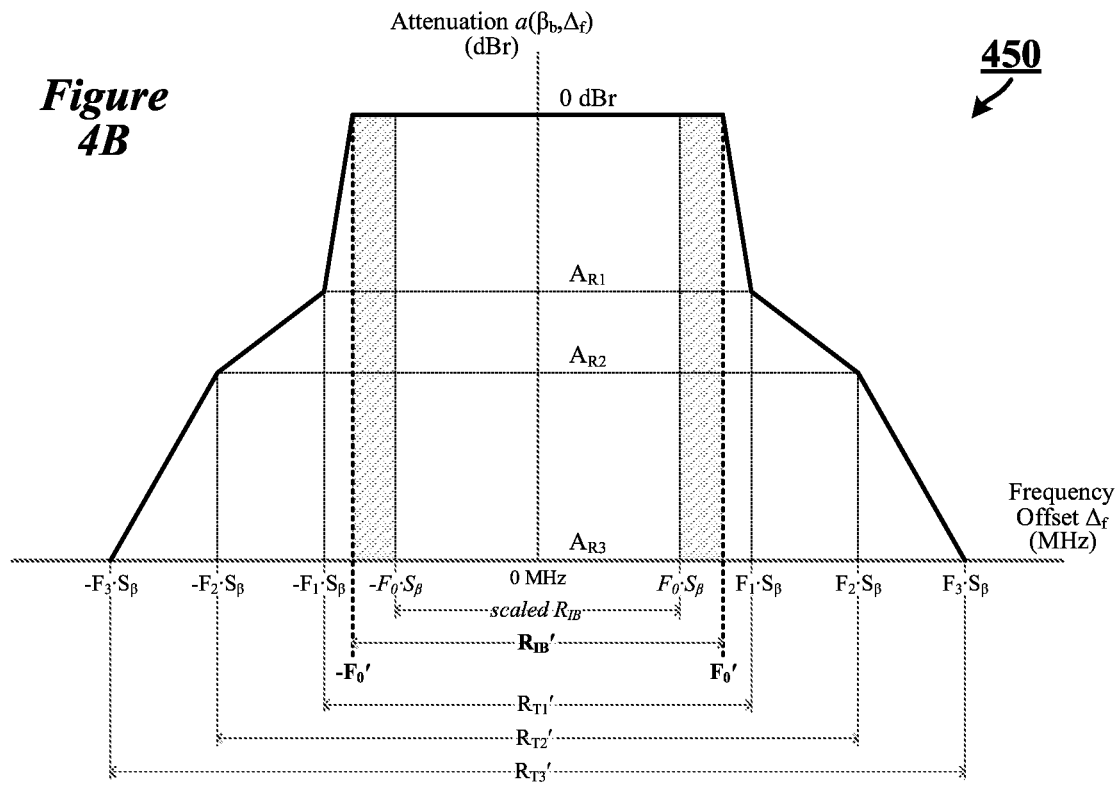
FIG. 4B illustrates a second example spectral mask structure.

FIG. 4B illustrates a second example spectral mask structure 450. The spectral mask structure 450 represents a spectral mask for RF transmissions of a bandwidth $\beta_b$. In some examples, the spectral mask structure 450 can correspond to spectral mask 312 of FIG. 3, and $\beta_b$ can correspond to the bandwidth of RF signal 313.

The spectral mask structure 450 is derivative of the spectral mask structure 400 of FIG. 4A, such that transitional frequency offset ranges of the spectral mask structure 450 correspond to transitional frequency offset ranges of the spectral mask structure 400 scaled according to a ratio $S_\beta$ between the bandwidth $\beta_b$ associated with the spectral mask structure 450 and the bandwidth $\beta_a$ associated with the spectral mask structure 400. Thus, a transitional frequency offset range $R_{T1}'$ associated with the same attenuation factor $A_{R1}$ as is transitional frequency offset range $R_{T1}$ of FIG. 4A spans between frequency offset values $-F_1 \cdot S_\beta$ and $F_1 \cdot S_\beta$. Similarly, transitional frequency offset ranges $R_{T2}'$ and $R_{T3}'$ associated with the same attenuation factors $A_{R2}$ and $A_{R3}$ as are transitional frequency offset ranges $R_{T1}$ and $R_{T1}$ of FIG. 4A span between frequency offset values $-F_2 \cdot S_\beta$ and $F_2 \cdot S_\beta$ and between frequency offset values $-F_3 \cdot S_\beta$ and $F_3 \cdot S_\beta$, respectively.

An in-band frequency offset range $R_{IB}'$ of the spectral mask structure 450 spans between frequency offset values $-F_0'$ and $F_0'$. The in-band frequency offset range $R_{IB}'$, the width of which is equal to $2 \cdot F_0'$, is wider than the scaled width $2 \cdot F_0$. $S_\beta$ of the in-band frequency offset range $R_{IB}$ of the spectral mask structure 400 of FIG. 4A. The shaded regions in FIG. 4B represent the additional width of the in-band frequency offset range $R_{IB}'$ relative to the scaled width of the in-band frequency offset range $R_{IB}$ of the spectral mask structure 400 of FIG. 4A.

As described above, in some examples, the spectral mask 312 of FIG. 3 can be derivative of a spectral mask used for transmission of a nominal carrier signal of a bandwidth of approximately 2.16 GHz in accordance with an IEEE 802.11ad PHY protocol. Table 1 shows attenuation factors and frequency offset range endpoints of such an 802.11ad spectral mask.

TABLE 1

| Carrier Signal Bandwidth | Frequency Offset Range | Attenuation Factor | Frequency Offset Endpoints | |
|---|---|---|---|---|
| 2.16 GHz | In-band | 0 | −940 | 940 |
| | T1 | −17 dBr | −1200 | 1200 |
| | T2 | −22 dBr | −2700 | 2700 |
| | T3 | −30 dBr | −3060 | 3060 |

In some examples, the spectral mask 312 can be derivative of the spectral mask illustrated in Table 1, and the bandwidth of the modulated mmWave carrier signal 310 can be approximately 160 MHz, approximately 320 MHz, approximately 480 MHz, approximately 640 MHz, or approximately 960 MHz.

In examples in which the bandwidth of the modulated mmWave carrier signal 310 is approximately 160 MHz, the ratio $S_\beta$ between the bandwidth of the modulated mmWave carrier signal 310 and the bandwidth of the nominal carrier signal can be approximately 1:13.5. The ratio $S_\beta$ between the bandwidth of the modulated mmWave carrier signal 310 and the bandwidth of the nominal carrier signal in examples in which the bandwidth of the modulated mmWave carrier signal 310 is approximately 320 MHz, approximately 480 MHz, approximately 640 MHz, or approximately 960 MHz can be approximately 1:6.75, 1:4.5, 1:3.375, and 1:2.25, respectively. Tables 2-6 show respective attenuation factors and frequency offset range endpoints associated with the spectral mask 312 for each of these five cases.

TABLE 2

| Carrier Signal Bandwidth | Frequency Offset Range | Attenuation Factor | Frequency Offset Endpoints | |
|---|---|---|---|---|
| 160 MHz | In-band | 0 | −78 | 78 |
| | T1 | −17 dBr | −88.8889 | 88.8889 |
| | T2 | −22 dBr | −200 | 200 |
| | T3 | −30 dBr | −226.6667 | 226.6667 |

TABLE 3

| Carrier Signal Bandwidth | Frequency Offset Range | Attenuation Factor | Frequency Offset Endpoints | |
|---|---|---|---|---|
| 320 MHz | In-band | 0 | −156 | 156 |
| | T1 | −17 dBr | −177.7778 | 177.7778 |
| | T2 | −22 dBr | −400 | 400 |
| | T3 | −30 dBr | −453.3333 | 453.3333 |

TABLE 4

| Carrier Signal Bandwidth | Frequency Offset Range | Attenuation Factor | Frequency Offset Endpoints | |
|---|---|---|---|---|
| 480 MHz | In-band | 0 | −234 | 234 |
| | T1 | −17 dBr | −266.6667 | 266.6667 |
| | T2 | −22 dBr | −600 | 600 |
| | T3 | −30 dBr | −680 | 680 |

TABLE 5

| Carrier Signal Bandwidth | Frequency Offset Range | Attenuation Factor | Frequency Offset Endpoints | |
|---|---|---|---|---|
| 640 MHz | In-band | 0 | −312 | 312 |
| | T1 | −17 dBr | −355.5556 | 355.5556 |
| | T2 | −22 dBr | −800 | 800 |
| | T3 | −30 dBr | −906.6667 | 906.6667 |

TABLE 6

| Carrier Signal Bandwidth | Frequency Offset Range | Attenuation Factor | Frequency Offset Endpoints | |
|---|---|---|---|---|
| 960 MHz | In-band | 0 | −468 | 468 |
| | TI | −17 dBr | −533.3333 | 533.3333 |
| | T2 | −22 dBr | −1200 | 1200 |
| | T3 | −30 dBr | −1360 | 1360 |

In some examples, the in-band frequency offset range endpoints associated with the spectral mask 312 for one or more of the 160 MHZ, 320 MHz, 480 MHz, 640 MHz, and 960 MHz carrier signal bandwidths can be further extended past the example endpoints shown in Tables 2-6. For instance, in some examples, the in-band frequency offset range endpoints for the 160 MHz carrier signal bandwidth can be −79.75 MHz and 79.75 MHz. In some examples, the in-band frequency offset range endpoints for the 320 MHz carrier signal bandwidth can be −159.5 MHz and 159.5 MHz. In some examples, the in-band frequency offset range endpoints for the 480 MHz carrier signal bandwidth can be −239.25 MHz and 239.25 MHz. In some examples, the in-band frequency offset range endpoints for the 640 MHz carrier signal bandwidth can be −319 MHz and 319 MHz. In some examples, the in-band frequency offset range endpoints for the 960 MHz carrier signal bandwidth can be −478.5 MHz and 478.5 MHz.

In some examples, the signal adjuster 311 can apply, for the modulated mmWave carrier signal 310, spectral flatness parameters associated with a data tone plan underlying transmission of the RF signal 313. In some examples, this data tone plan can be a data tone plan that defines a set of data tones according to a second data tone plan underlying transmission of a second nominal carrier signal and a ratio between the bandwidth of the RF signal 313 and a bandwidth of the second nominal carrier signal (such a data tone plan may be referred to herein as a "derivative data tone plan"). In some examples, the second nominal carrier signal can differ from the first nominal carrier signal associated with the spectral mask that is scaled to produce the spectral mask 312. In some examples, the data tone plan for the second nominal carrier signal can be an IEEE 802.11ac or IEEE 802.11be data tone plan associated with carrier signals of a bandwidth matching the bandwidth of the second nominal carrier signal. In some examples, the data tone plan underlying transmission of the RF signal 313 can define a set of data tones that corresponds to a second set of data tones defined by the data tone plan for the second nominal carrier signal, upclocked by the ratio between the bandwidth of the RF signal 313 and the bandwidth of the second nominal carrier signal.

In some examples, the bandwidth of the RF signal 313 can be approximately 160 MHz, and the data tone plan underlying transmission of the RF signal 313 can define a set of data tones that corresponds to a second set of data tones defined by an IEEE 802.11ac data tone plan for transmissions of 20 MHz bandwidth, upclocked by a factor of 8.

In some other examples, the bandwidth of the RF signal 313 can be approximately 320 MHz, and the data tone plan underlying transmission of RF signal 313 can define a set of data tones that corresponds to a second set of data tones defined by an IEEE 802.11ac data tone plan for transmissions of 80 MHz bandwidth, upclocked by a factor of 4. In some other examples, the bandwidth of the RF signal 313 can be approximately 320 MHz, and the data tone plan underlying transmission of RF signal 313 can define a set of data tones that corresponds to a second set of data tones defined by an IEEE 802.11be data tone plan for transmissions of 20 MHz bandwidth, upclocked by a factor of 16. In some other examples, the bandwidth of the RF signal 313 can be approximately 320 MHz, and the data tone plan underlying transmission of RF signal 313 can define a set of data tones that corresponds to a second set of data tones defined by an IEEE 802.11ac data tone plan for transmissions of 40 MHz bandwidth, upclocked by a factor of 8.

In some other examples, the bandwidth of the RF signal 313 can be approximately 480 MHz, and the data tone plan underlying transmission of RF signal 313 can define a set of data tones that corresponds to a second set of data tones defined by an IEEE 802.11ac data tone plan for transmissions of 80 MHz bandwidth, upclocked by a factor of 6. In some other examples, the bandwidth of the RF signal 313 can be approximately 480 MHz, and the data tone plan underlying transmission of RF signal 313 can define a set of data tones that corresponds to a second set of data tones defined by an IEEE 802.11be data tone plan for transmissions of 20 MHz bandwidth, upclocked by a factor of 24.

In some other examples, the bandwidth of the RF signal 313 can be approximately 640 MHz, and the data tone plan underlying transmission of RF signal 313 can define a set of data tones that corresponds to a second set of data tones defined by an IEEE 802.11ac data tone plan for transmissions of 160 MHz or 80+80 MHZ bandwidth, upclocked by a factor of 4. In some other examples, the bandwidth of the RF signal 313 can be approximately 640 MHz, and the data tone plan underlying transmission of RF signal 313 can define a set of data tones that corresponds to a second set of data tones defined by an IEEE 802.11be data tone plan for transmissions of 20+20 MHz bandwidth, upclocked by a factor of 16. In some other examples, the bandwidth of the RF signal 313 can be approximately 640 MHz, and the data tone plan underlying transmission of RF signal 313 can define a set of data tones that corresponds to a second set of data tones defined by an IEEE 802.11ac data tone plan for transmissions of 80 MHz bandwidth, upclocked by a factor of 8.

In some other examples, the bandwidth of the RF signal 313 can be approximately 960 MHz, and the data tone plan underlying transmission of RF signal 313 can define a set of data tones that corresponds to a second set of data tones defined by an IEEE 802.11ac data tone plan for transmissions of 160 MHz or 80+80 MHZ bandwidth, upclocked by a factor of 6. In some other examples, the bandwidth of the RF signal 313 can be approximately 960 MHz, and the data tone plan underlying transmission of RF signal 313 can define a set of data tones that corresponds to a second set of data tones defined by an IEEE 802.11be data tone plan for transmissions of 20+20 MHz bandwidth, upclocked by a factor of 24.

In some other examples, the bandwidth of the RF signal 313 can be approximately 1280 MHz, and the data tone plan underlying transmission of RF signal 313 can define a set of data tones that corresponds to a second set of data tones defined by an IEEE 802.11ac data tone plan for transmissions of 160 MHz or 80+80 MHZ bandwidth, upclocked by a factor of 8.

In some examples in which the data tone plan underlying transmission for RF signal 313 is derivative of a second data tone plan, spectral flatness parameters associated with the second data tone plan can be used as the spectral flatness parameters applied for transmission of the RF signal 313. For example, according to some aspects disclosed herein, spectral flatness parameters associated with the second data tone plan can be used as the spectral flatness parameters applied for transmission of the RF signal 313 in instances in which the second data tone plan is an IEEE 802.11ac or IEEE 802.11ax data tone plan.

In some examples, the bandwidth of the RF signal 313 can be approximately 640 MHz or approximately 960 MHz, and the data tone plan underlying transmission of RF signal 313 can define a set of data tones that corresponds to a second set of data tones defined by an IEEE 802.11be data tone plan for transmissions of 20+20 MHz bandwidth, upclocked by a factor of 16 or 24, respectively. In some such examples, the spectral flatness parameters applied for transmission of the RF signal 313 can define a tone range of −256 to 255, within which the populated tones can be tones −250 to −130, −126 to −6, 6 to 126, and 130 to 250. In some such examples, the outer-most inner subcarriers can correspond to tones −172 and 172, and the inner-most inner subcarriers can correspond to tones −44 and 44. Table 7 shows spectral flatness parameters that can be used as the spectral flatness parameters applied for transmission of the RF signal 313 in some examples in which the bandwidth of the RF signal 313 is approximately 640 MHz or approximately 960 MHz, and the data tone plan underlying transmission of RF signal 313 corresponds to an IEEE 802.11be data tone plan for transmissions of 20+20 MHz bandwidth, upclocked by a factor of 16 or 24, respectively.

TABLE 7

| Bandwidth of transmission (MHz) | Averaging subcarrier indices (inclusive) | Tested subcarrier indices (inclusive) | Maximum deviation (dB) |
| --- | --- | --- | --- |
| 640/960 MHz | −172 to −130, −126 to −44, 44 to 126, and 130 to 172 | −172 to −130, −126 to −44, 44 to 126, and 130 to 172 −250 to −173, −43 to −6, 6 to 43, and 173 to 250 | ±4 +4/−6 |

Figure 5:
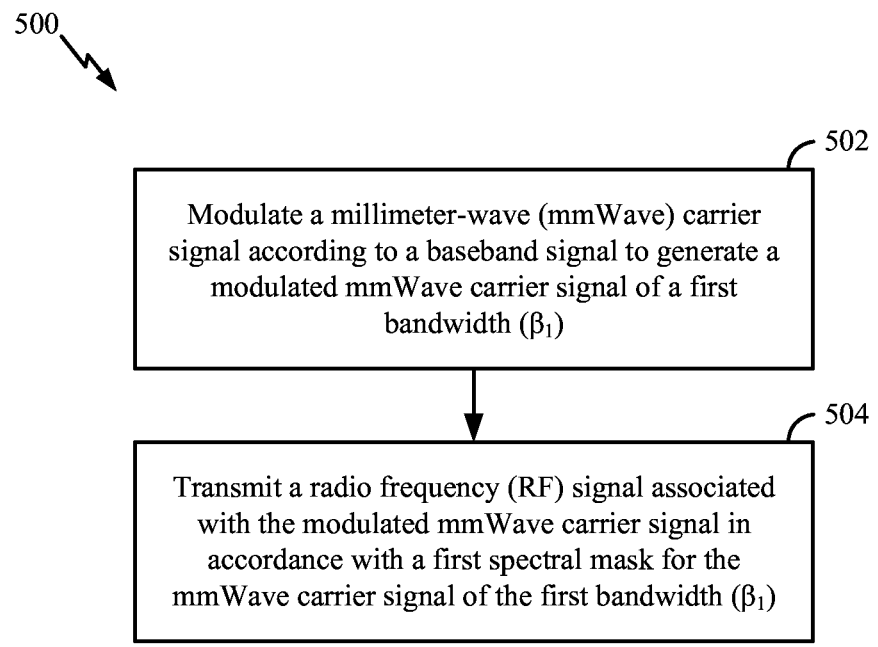
FIG. 5 shows a flowchart illustrating an example process performable by a wireless communication device that supports the application of spectral masks and spectral flatness parameters according to some aspects of the present disclosure.

FIG. 5 shows a flowchart illustrating an example process 500 performable by a wireless communication device that supports the application of spectral masks and spectral flatness parameters according to aspects described herein. The operations of the process 500 may be implemented by a wireless STA or AP, or its components, as described herein. In some examples, the process 500 may be performed by a wireless communication device, such as the wireless communication device 301 described with reference to FIG. 3 or the wireless communication device 600 described with reference to FIG. 6, operating as or within a wireless AP. In some examples, the process 500 may be performed by a wireless communication device, such as the wireless communication device 301 described with reference to FIG. 3 or the wireless communication device 600 described with reference to FIG. 6, operating as or within a wireless STA. In some examples, the process 500 may be performed by a wireless AP such as the wireless AP 102 described with reference to FIG. 1 or the wireless AP 202 described with reference to FIG. 2. In some examples, the process 500 may be performed by a wireless STA such as one of the wireless STAs 104 described with reference to FIG. 1 or one of the wireless STAs 204 described with reference to FIG. 2.

According to process 500, a wireless communication device can modulate a mmWave carrier signal in block 502 according to a baseband signal to generate a modulated mmWave carrier signal of a first bandwidth ($\beta_1$). For example, in the operating environment 300 of FIG. 3, the wireless communication device 301 can mix the mmWave carrier signal 308 with the baseband signal 304 to generate the modulated mmWave carrier signal 310. In block 504, the wireless communication device can transmit an RF signal associated with the modulated mmWave carrier signal in accordance with a first spectral mask for the mmWave carrier signal of the first bandwidth ($\beta_1$). For example, in the operating environment 300 of FIG. 3, the wireless communication device 301 can transmit the RF signal 313 associated with the modulated mmWave carrier signal 310 in accordance with a spectral mask for the modulated mmWave carrier signal 310.

The first spectral mask defines an in-band frequency offset range and multiple transitional frequency offset ranges, including a respective transitional frequency offset range for each of multiple attenuation factors, where, for each of the multiple attenuation factors, the respective transitional frequency offset range corresponds to a transitional frequency offset range for that attenuation factor associated with a second spectral mask for a first nominal carrier signal of a second bandwidth ($\beta_2$) scaled according to a ratio $S_\beta$ between the first bandwidth ($\beta_1$) and the second bandwidth ($\beta_2$). A width of the in-band frequency offset range is wider than a width of an in-band frequency offset range of the second spectral mask for the first nominal carrier signal scaled according to the ratio $S_\beta$.

In some examples, a center frequency of the mmWave carrier signal can be a frequency in a 60 GHz frequency band or a 45 GHz frequency band. In some examples, the second spectral mask can be an IEEE 802.11ad-compliant spectral mask. In some examples, the second bandwidth ($\beta_2$) can be approximately 2.16 GHz. In some examples, the multiple attenuation factors can include attenuation factors of approximately −17 dBr, approximately −22 dBr, and approximately −30 dBr. In some examples, the first bandwidth ($\beta_1$) can be approximately 160 MHz, approximately 320 MHz, approximately 480 MHz, approximately 640 MHz, or approximately 960 MHz.

In some examples, the wireless communication device can transmit the RF signal associated with the modulated mmWave carrier signal in accordance with a first data tone plan that defines a first set of data tones according to a second data tone plan for a second nominal carrier signal of a third bandwidth ($\beta_3$) and a ratio between the first bandwidth ($\beta_1$) and the third bandwidth ($\beta_3$). In some examples, the first set of data tones can correspond to the second data tone plan upclocked by the ratio between the first bandwidth ($\beta_1$) and the third bandwidth ($\beta_3$). In some examples, the wireless communication device can transmit the RF signal associated with the modulated mmWave carrier signal in accordance with spectral flatness parameters associated with the second data tone plan.

Figure 6:
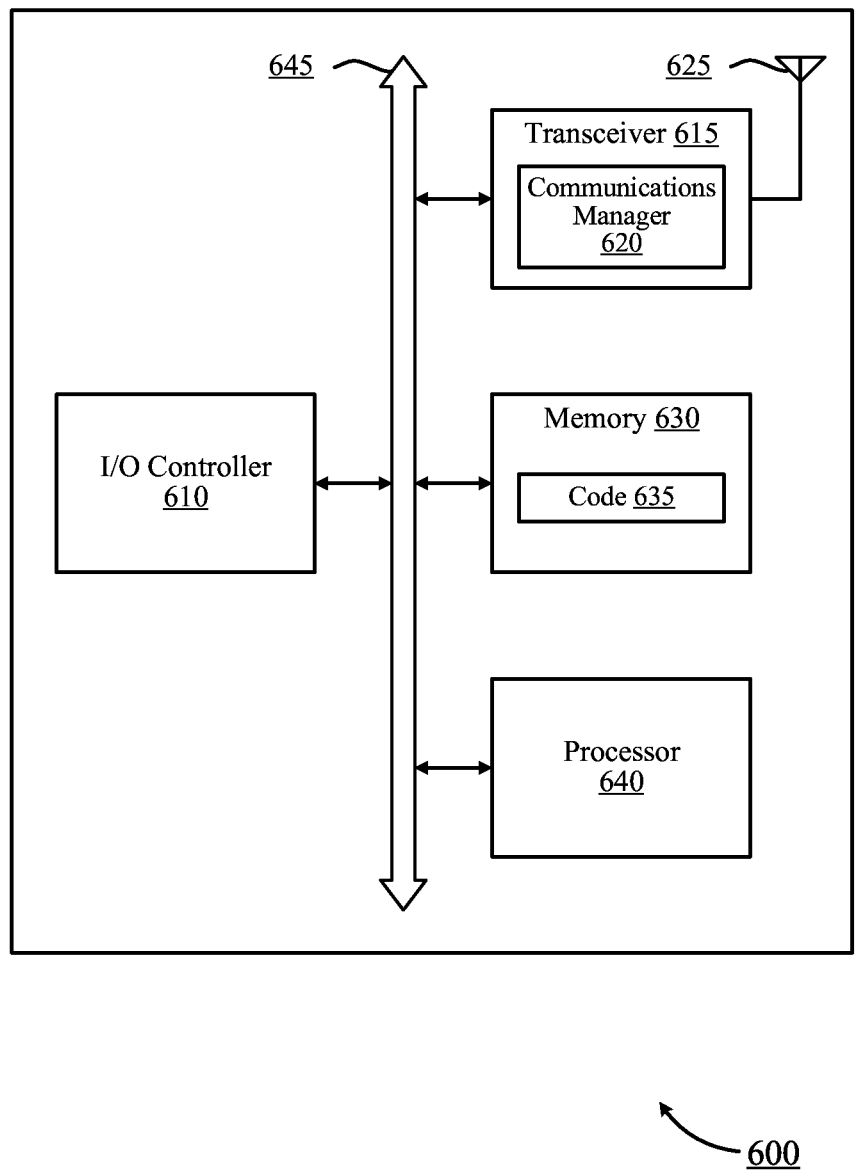
FIG. 6 shows a block diagram of an example wireless communication device that supports the application of spectral masks and spectral flatness parameters according to some aspects of the present disclosure.

FIG. 6 shows a block diagram of an example wireless communication device 600 that supports the application of spectral masks and spectral flatness parameters according to aspects described herein. In some examples, the wireless communication device 600 can be configured or operable to perform the process 500 described above with reference to FIG. 5. In some examples, the wireless communication device 600 may be representative of one or both of wireless communication devices 301 and 315 described above with reference to FIG. 3. In various examples, the wireless communication device 600 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 600 can be a chip, SoC, chipset, package or device for use in a wireless AP, such as the wireless AP 102 described above with reference to FIG. 1 or the wireless AP 202 described above with reference to FIG. 2. In some other examples, the wireless communication device 600 can be a wireless AP that includes such a chip, SoC, chipset, package or device as well as at least one antenna. In yet other examples, the wireless communication device 600 can be a chip, SoC, chipset, package or device for use in a wireless STA, such one of the wireless STAs 104 described with reference to FIG. 1 or one of the wireless STAs 204 described with reference to FIG. 2. In still other examples, the wireless communication device 600 can be a wireless STA that includes such a chip, SoC, chipset, package or device as well as at least one antenna.

The wireless communication device 600 can be capable of transmitting and receiving wireless communications in the form of, for example, wireless packets. For example, the wireless communication device 600 can be configured or operable to transmit and receive packets in the form of physical layer PPDUs and MPDUs conforming to one or more of the IEEE 802.11 family of wireless communication protocol standards. In some examples, the wireless communication device 600 can also include or can be coupled with an application processor which may be further coupled with another memory. In some examples, the wireless communication device 600 can further include at least one external network interface that enables communication with a core network or backhaul network to gain access to external networks including the Internet. In some examples, the wireless communication device 600 can further include a user interface (UI) (such as a touchscreen or keypad) and a display, which may be integrated with the UI to form a touchscreen display. In some examples, the wireless communication device 600 can further include one or more sensors such as, for example, one or more inertial sensors, accelerometers, temperature sensors, pressure sensors, or altitude sensors.

The wireless communication device 600 may include components for bi-directional communications including components for transmitting and receiving communications, such as a communications manager 620, an input/output (I/O) controller 610, a transceiver 615, an antenna 625, a memory 630, code 635 and a processor 640. These components may be in electronic communication or otherwise coupled (such as operatively, communicatively, functionally, electronically, electrically) via one or more buses (such as a bus 645).

The I/O controller 610 may manage input and output signals for the wireless communication device 600. The I/O controller 610 also may manage peripherals not integrated into the wireless communication device 600. In some examples, the I/O controller 610 may represent a physical connection or port to an external peripheral. In some examples, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some examples, the I/O controller 610 may be implemented as part of a processor or processing system, such as the processor 640. In some examples, a user may interact with the wireless communication device 600 via the I/O controller 610 or via hardware components controlled by the I/O controller 610.

In some examples, the wireless communication device 600 may include a single antenna 625. However, in some other examples, the wireless communication device 600 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625.

In some examples, the transceiver 615 may include one or more interfaces, such as one or more interfaces coupled with the one or more antennas 625 that are configured to support various receiving or obtaining operations, or one or more interfaces coupled with the one or more antennas 625 that are configured to support various transmitting or outputting operations, or a combination thereof. In some examples, the transceiver 615 may include or be configured for coupling with one or more processors or memory components that are operable to perform or support operations associated with received or obtained information or signals, or to generate information or other signals for transmission or other outputting, or any combination thereof. In some examples, the transceiver 615, or the transceiver 615 and the one or more antennas 625, or the transceiver 615 and the one or more antennas 625 and one or more processors or memory components (for example, the processor 640, or the memory 630, or both), may be included in a chip or chip assembly that is installed in the wireless communication device 600.

The memory 630 may include random access memory (RAM) and read-only memory (ROM). The memory 630 may store computer-readable, computer-executable code 635 including instructions that, when executed by the processor 640, cause the wireless communication device 600 to perform various functions described herein. The code 635 may be stored in a non-transitory computer-readable medium such as system memory or another type of memory. In some examples, the code 635 may not be directly executable by the processor 640 but may cause a computer (for example, when compiled and executed) to perform functions described herein. In some examples, the memory 630 may contain, among other things, a basic I/O system (BIOS) which may control basic hardware or software operation such as the interaction with peripheral components or devices.

The processor 640 may be any one or more suitable processors capable of executing scripts or instructions of one or more software programs stored in the wireless communication device 600 (such as within the memory 630). In some examples, the processor 640 may be a component of a processing system. A processing system may generally refer to a system or series of machines or components that receives inputs and processes the inputs to produce a set of outputs (which may be passed to other systems or components of, for example, the wireless communication device 600). For example, a processing system of the wireless communication device 600 may refer to a system including the various other components or subcomponents of the wireless communication device 600, such as the processor 640, or the transceiver 615, or the communications manager 620, or other components or combinations of components of the wireless communication device 600. The processing system of the wireless communication device 600 may interface with other components of the wireless communication device 600, and may process information received from other components (such as inputs or signals) or output information to other components. For example, a chip or modem of the wireless communication device 600 may include a processing system, a first interface to output information and a second interface to obtain information. In some examples, the first interface may refer to an interface between the processing system of the chip or modem and a transmitter, such that the wireless communication device 600 may transmit information output from the chip or modem. In some examples, the second interface may refer to an interface between the processing system of the chip or modem and a receiver, such that the wireless communication device 600 may obtain information or signal inputs, and the information may be passed to the processing system. A person having ordinary skill in the art will readily recognize that the first interface also may obtain information or signal inputs, and the second interface also may output information or signal outputs.

The communications manager 620 may support wireless communication by wireless communication device 600 in accordance with examples as disclosed herein. For example, the communications manager 620 may be configured as or otherwise support a means for modulating a millimeter-wave (mmWave) carrier signal according to a baseband signal to generate a modulated mmWave carrier signal of a first bandwidth ($\beta_1$). The communications manager 620 may further be configured as or otherwise support a means for transmitting a radio frequency (RF) signal associated with the modulated mmWave carrier signal in accordance with a first spectral mask for the mmWave carrier signal of the first bandwidth ($\beta_1$).

The first spectral mask can define an in-band frequency offset range and multiple transitional frequency offset ranges, including a respective transitional frequency offset range for each of multiple attenuation factors, where, for each of the multiple attenuation factors, the respective transitional frequency offset range corresponds to a transitional frequency offset range for that attenuation factor associated with a second spectral mask for a nominal carrier signal of a second bandwidth ($\beta_2$) scaled according to a ratio $S_\beta$ between the first bandwidth ($\beta_1$) and the second bandwidth ($\beta_2$). A width of the in-band frequency offset range can be wider than a width of an in-band frequency offset range of the second spectral mask for the nominal carrier signal scaled according to the ratio $S_\beta$.

In some examples, the communications manager 620 may be configured to perform various operations (for example, receiving, monitoring, transmitting) using or otherwise in cooperation with the transceiver 615, the one or more antennas 625, or any combination thereof. Although the communications manager 620 is illustrated as a separate component, in some examples, one or more functions described with reference to the communications manager 620 may be supported by or performed by the processor 640, the memory 630, the code 635, or any combination thereof. For example, the code 635 may include instructions executable by the processor 640 to cause the wireless communication device 600 to perform various aspects of applying spectral masks and spectral flatness parameters as described herein, or the processor 640 and the memory 630 may be otherwise configured to perform or support such operations.

Implementation examples are described in the following numbered clauses:

Clause 1. A wireless communication device, including at least one memory, and at least one processor communicatively coupled with the at least one memory, the at least one processor operable to cause the wireless communication device to modulate a millimeter-wave (mmWave) carrier signal according to a baseband signal to generate a modulated mmWave carrier signal of a first bandwidth ($\beta_1$), and transmit a radio frequency (RF) signal associated with the modulated mmWave carrier signal in accordance with a first spectral mask for the mmWave carrier signal of the first bandwidth ($\beta_1$), where the first spectral mask defines an in-band frequency offset range, and multiple transitional frequency offset ranges, including a respective transitional frequency offset range for each of multiple attenuation factors, where for each of the multiple attenuation factors, the respective transitional frequency offset range corresponds to a transitional frequency offset range for that attenuation factor associated with a second spectral mask for a nominal carrier signal of a second bandwidth ($\beta_2$) scaled according to a ratio $S_\beta$ between the first bandwidth ($\beta_1$) and the second bandwidth ($\beta_2$), where a width of the in-band frequency offset range is wider than a width of an in-band frequency offset range of the second spectral mask for the nominal carrier signal scaled according to the ratio $S_\beta$.

Clause 2. The wireless communication device of clause 1, where a center frequency of the mmWave carrier signal is a frequency in a 60 GHz frequency band or a 45 GHz frequency band.

Clause 3. The wireless communication device of any of clauses 1 to 2, where a center frequency of the nominal carrier signal is a frequency in a sub-7 GHZ frequency band.

Clause 4. The wireless communication device of clause 3, where the sub-7 GHz frequency band is a 2.4 GHz frequency band, a 5 GHz frequency band, or a 6 GHz frequency band.

Clause 5. The wireless communication device of any of clauses 1 to 4, where the second spectral mask is an Institute of Electrical and Electronics Engineers (IEEE) 802.11ad-compliant spectral mask.

Clause 6. The wireless communication device of any of clauses 1 to 5, where the second bandwidth ($\beta_2$) is approximately 2.16 GHz.

Clause 7. The wireless communication device of clause 6, where the spectral mask for the nominal carrier signal of the second bandwidth ($\beta_2$) defines an in-band frequency offset range of approximately −940 MHz to +940 MHZ, a first transitional frequency offset range of approximately −1200 MHz to +1200 MHz for a first attenuation factor, a second transitional frequency offset range of approximately −2700 MHz to +2700 MHz for a second attenuation factor, and a third transitional frequency offset range of approximately −3060 MHz to +3060 MHz for a third attenuation factor.

Clause 8. The wireless communication device of clause 7, where the first attenuation factor is approximately −17 dBr, the second attenuation factor is approximately −22 dBr, and the third attenuation factor is approximately −30 dBr.

Clause 9. The wireless communication device of any of clauses 7 to 8, where the first bandwidth ($\beta_1$) is approximately 160 MHZ, where the spectral mask for the mmWave carrier signal of the first bandwidth ($\beta_1$) defines an in-band frequency offset range of approximately −78 MHz to +78 MHz, a first transitional frequency offset range of approximately −88.8889 MHz to +88.8889 MHz for the first attenuation factor, a second transitional frequency offset range of approximately −200 MHz to +200 MHZ for the second attenuation factor, and a third transitional frequency offset range of approximately −226.6667 MHZ to +226.6667 MHZ for the third attenuation factor.

Clause 10. The wireless communication device of any of clauses 7 to 8, where the first bandwidth ($\beta_1$) is approximately 320 MHZ, where the spectral mask for the mmWave carrier signal of the first bandwidth ($\beta_1$) defines an in-band frequency offset range of approximately −156 MHz to +156 MHz, a first transitional frequency offset range of approximately −177.7778 MHz to +177.7778 MHz for the first attenuation factor, a second transitional frequency offset range of approximately −400 MHz to +400 MHz for the second attenuation factor, and a third transitional frequency offset range of approximately −453.3333 MHz to +453.3333 MHz for the third attenuation factor.

Clause 11. The wireless communication device of any of clauses 7 to 8, where the first bandwidth ($\beta_1$) is approximately 480 MHZ, where the spectral mask for the mmWave carrier signal of the first bandwidth ($\beta_1$) defines an in-band frequency offset range of approximately −234 MHz to +234 MHZ, a first transitional frequency offset range of approximately −266.6667 MHz to +266.6667 MHz for the first attenuation factor, a second transitional frequency offset range of approximately −600 MHz to +600 MHz for the second attenuation factor, and a third transitional frequency offset range of approximately −680 MHz to +680 MHz for the third attenuation factor.

Clause 12. The wireless communication device of any of clauses 7 to 8, where the first bandwidth ($\beta_1$) is approximately 640 MHz, where the spectral mask for the mmWave carrier signal of the first bandwidth ($\beta_1$) defines an in-band frequency offset range of approximately −312 MHz to +312 MHz, a first transitional frequency offset range of approximately −355.5556 MHz to +355.5556 MHz for the first attenuation factor, a second transitional frequency offset range of approximately −800 MHz to +800 MHz for the second attenuation factor, and a third transitional frequency offset range of approximately −906.6667 MHz to +906.6667 MHZ for the third attenuation factor.

Clause 13. The wireless communication device of any of clauses 7 to 8, where the first bandwidth ($\beta_1$) is approximately 960 MHz, where the spectral mask for the mmWave carrier signal of the first bandwidth ($\beta_1$) defines an in-band frequency offset range of approximately −468 MHz to +468 MHz, a first transitional frequency offset range of approximately −533.3333 MHz to +533.3333 MHz for the first attenuation factor, a second transitional frequency offset range of approximately −1200 MHz to +1200 MHz for the second attenuation factor, and a third transitional frequency offset range of approximately −1360 MHz to +1360 MHz for the third attenuation factor.

Clause 14. The wireless communication device of any of clauses 1 to 13, where the at least one processor is operable to cause the wireless communication device to transmit the RF signal in accordance with a first data tone plan, where the first data tone plan defines a first set of data tones according to a second data tone plan for a second nominal carrier signal of a third bandwidth ($\beta_3$) and a ratio between the first bandwidth ($\beta_1$) and the third bandwidth ($\beta_3$).

Clause 15. The wireless communication device of clause 14, where the first set of data tones corresponds to the second data tone plan upclocked by the ratio between the first bandwidth ($\beta_1$) and the third bandwidth ($\beta_3$).

Clause 16. The wireless communication device of any of clauses 14 to 15, where the at least one processor is operable to cause the wireless communication device to transmit the RF signal in accordance with spectral flatness parameters associated with the second data tone plan.

Clause 17. A method for wireless communication by a wireless communication device, including modulating a millimeter-wave (mmWave) carrier signal according to a baseband signal to generate a modulated mmWave carrier signal of a first bandwidth ($\beta_1$), and transmitting a radio frequency (RF) signal associated with the modulated mmWave carrier signal in accordance with a first spectral mask for the mmWave carrier signal of the first bandwidth ($\beta_1$), where the first spectral mask defines an in-band frequency offset range, and multiple transitional frequency offset ranges, including a respective transitional frequency offset range for each of multiple attenuation factors, where for each of the multiple attenuation factors, the respective transitional frequency offset range corresponds to a transitional frequency offset range for that attenuation factor associated with a second spectral mask for a nominal carrier signal of a second bandwidth ($\beta_2$) scaled according to a ratio $S_\beta$ between the first bandwidth ($\beta_1$) and the second bandwidth ($\beta_2$), where a width of the in-band frequency offset range is wider than a width of an in-band frequency offset range of the second spectral mask for the nominal carrier signal scaled according to the ratio $S_\beta$.

Clause 18. The method of clause 17, where a center frequency of the mm Wave carrier signal is a frequency in a 60 GHz frequency band or a 45 GHZ frequency band.

Clause 19. The method of any of clauses 17 to 18, where a center frequency of the nominal carrier signal is a frequency in a sub-7 GHz frequency band.

Clause 20. The method of clause 19, where the sub-7 GHz frequency band is a 2.4 GHz frequency band, a 5 GHz frequency band, or a 6 GHz frequency band.

Clause 21. The method of any of clauses 17 to 20, where the second spectral mask is an Institute of Electrical and Electronics Engineers (IEEE) 802.11ad-compliant spectral mask.

Clause 22. The method of any of clauses 17 to 21, where the second bandwidth ($\beta_2$) is approximately 2.16 GHz.

Clause 23. The method of clause 22, where the spectral mask for the nominal carrier signal of the second bandwidth ($\beta_2$) defines an in-band frequency offset range of approximately −940 MHz to +940 MHz, a first transitional frequency offset range of approximately −1200 MHz to +1200 MHz for a first attenuation factor, a second transitional frequency offset range of approximately −2700 MHZ to +2700 MHZ for a second attenuation factor, and a third transitional frequency offset range of approximately −3060 MHz to +3060 MHz for a third attenuation factor.

Clause 24. The method of clause 23, where the first attenuation factor is approximately −17 dBr, the second attenuation factor is approximately −22 dBr, and the third attenuation factor is approximately −30 dBr.

Clause 25. The method of any of clauses 23 to 24, where the first bandwidth ($\beta_1$) is approximately 160 MHZ, where the spectral mask for the mmWave carrier signal of the first bandwidth ($\beta_1$) defines an in-band frequency offset range of approximately −78 MHz to +78 MHZ, a first transitional frequency offset range of approximately −88.8889 MHz to +88.8889 MHz for the first attenuation factor, a second transitional frequency offset range of approximately −200 MHz to +200 MHZ for the second attenuation factor, and a third transitional frequency offset range of approximately −226.6667 MHZ to +226.6667 MHZ for the third attenuation factor.

Clause 26. The method of any of clauses 23 to 24, where the first bandwidth ($\beta_1$) is approximately 320 MHZ, where the spectral mask for the mmWave carrier signal of the first bandwidth ($\beta_1$) defines an in-band frequency offset range of approximately −156 MHz to +156 MHz, a first transitional frequency offset range of approximately −177.7778 MHz to +177.7778 MHz for the first attenuation factor, a second transitional frequency offset range of approximately −400 MHZ to +400 MHZ for the second attenuation factor, and a third transitional frequency offset range of approximately −453.3333 MHZ to +453.3333 MHz for the third attenuation factor.

Clause 27. The method of any of clauses 23 to 24, where the first bandwidth ($\beta_1$) is approximately 480 MHZ, where the spectral mask for the mmWave carrier signal of the first bandwidth ($\beta_1$) defines an in-band frequency offset range of approximately −234 MHz to +234 MHZ, a first transitional frequency offset range of approximately −266.6667 MHZ to +266.6667 MHZ for the first attenuation factor, a second transitional frequency offset range of approximately −600 MHz to +600 MHZ for the second attenuation factor, and a third transitional frequency offset range of approximately −680 MHz to +680 MHz for the third attenuation factor.

Clause 28. The method of any of clauses 23 to 24, where the first bandwidth ($\beta_1$) is approximately 640 MHZ, where the spectral mask for the mmWave carrier signal of the first bandwidth ($\beta_1$) defines an in-band frequency offset range of approximately −312 MHz to +312 MHz, a first transitional frequency offset range of approximately −355.5556 MHz to +355.5556 MHz for the first attenuation factor, a second transitional frequency offset range of approximately −800 MHZ to +800 MHZ for the second attenuation factor, and a third transitional frequency offset range of approximately −906.6667 MHZ to +906.6667 MHz for the third attenuation factor.

Clause 29. The method of any of clauses 23 to 24, where the first bandwidth ($\beta_1$) is approximately 960 MHz, where the spectral mask for the mmWave carrier signal of the first bandwidth ($\beta_1$) defines an in-band frequency offset range of approximately −468 MHz to +468 MHz, a first transitional frequency offset range of approximately −533.3333 MHz to +533.3333 MHz for the first attenuation factor, a second transitional frequency offset range of approximately −1200 MHz to +1200 MHZ for the second attenuation factor, and a third transitional frequency offset range of approximately −1360 MHz to +1360 MHz for the third attenuation factor.

Clause 30. The method of any of clauses 17 to 29, further including transmitting the RF signal in accordance with a first data tone plan, where the first data tone plan defines a first set of data tones according to a second data tone plan for a second nominal carrier signal of a third bandwidth ($\beta_3$) and a ratio between the first bandwidth ($\beta_1$) and the third bandwidth ($\beta_3$).

Clause 31. The method of clause 30, where the first set of data tones corresponds to the second data tone plan upclocked by the ratio between the first bandwidth ($\beta_1$) and the third bandwidth ($\beta_3$).

Clause 32. The method of any of clauses 30 to 31, further including transmitting the RF signal in accordance with spectral flatness parameters associated with the second data tone plan.

Clause 33. An apparatus for wireless communication by a wireless communication device, including means for modulating a millimeter-wave (mmWave) carrier signal according to a baseband signal to generate a modulated mmWave carrier signal of a first bandwidth ($\beta_1$), and means for transmitting a radio frequency (RF) signal associated with the modulated mmWave carrier signal in accordance with a first spectral mask for the mmWave carrier signal of the first bandwidth ($\beta_1$), where the first spectral mask defines an in-band frequency offset range, and multiple transitional frequency offset ranges, including a respective transitional frequency offset range for each of multiple attenuation factors, where for each of the multiple attenuation factors, the respective transitional frequency offset range corresponds to a transitional frequency offset range for that attenuation factor associated with a second spectral mask for a nominal carrier signal of a second bandwidth ($\beta_2$) scaled according to a ratio $S_\beta$ between the first bandwidth ($\beta_1$) and the second bandwidth ($\beta_2$), where a width of the in-band frequency offset range is wider than a width of an in-band frequency offset range of the second spectral mask for the nominal carrier signal scaled according to the ratio $S_\beta$.

Clause 34. The apparatus of clause 33, where a center frequency of the mm Wave carrier signal is a frequency in a 60 GHz frequency band or a 45 GHz frequency band.

Clause 35. The apparatus of any of clauses 33 to 34, where a center frequency of the nominal carrier signal is a frequency in a sub-7 GHz frequency band.

Clause 36. The apparatus of clause 35, where the sub-7 GHz frequency band is a 2.4 GHz frequency band, a 5 GHz frequency band, or a 6 GHz frequency band.

Clause 37. The apparatus of any of clauses 33 to 36, where the second spectral mask is an Institute of Electrical and Electronics Engineers (IEEE) 802.11ad-compliant spectral mask.

Clause 38. The apparatus of any of clauses 33 to 37, where the second bandwidth ($\beta_2$) is approximately 2.16 GHz.

Clause 39. The apparatus of clause 38, where the spectral mask for the nominal carrier signal of the second bandwidth ($\beta_2$) defines an in-band frequency offset range of approximately −940 MHz to +940 MHz, a first transitional frequency offset range of approximately −1200 MHz to +1200 MHz for a first attenuation factor, a second transitional frequency offset range of approximately −2700 MHZ to +2700 MHZ for a second attenuation factor, and a third transitional frequency offset range of approximately −3060 MHz to +3060 MHz for a third attenuation factor.

Clause 40. The apparatus of clause 39, where the first attenuation factor is approximately −17 dBr, the second attenuation factor is approximately −22 dBr, and the third attenuation factor is approximately −30 dBr.

Clause 41. The apparatus of any of clauses 39 to 40 where the first bandwidth ($\beta_1$) is approximately 160 MHz, where the spectral mask for the mmWave carrier signal of the first bandwidth ($\beta_1$) defines an in-band frequency offset range of approximately −78 MHz to +78 MHz, a first transitional frequency offset range of approximately −88.8889 MHz to +88.8889 MHz for the first attenuation factor, a second transitional frequency offset range of approximately −200 MHz to +200 MHz for the second attenuation factor, and a third transitional frequency offset range of approximately −226.6667 MHZ to +226.6667 MHZ for the third attenuation factor.

Clause 42. The apparatus of any of clauses 39 to 40, where the first bandwidth ($\beta_1$) is approximately 320 MHZ, where the spectral mask for the mmWave carrier signal of the first bandwidth ($\beta_1$) defines an in-band frequency offset range of approximately −156 MHz to +156 MHZ, a first transitional frequency offset range of approximately −177.7778 MHz to +177.7778 MHz for the first attenuation factor, a second transitional frequency offset range of approximately −400 MHZ to +400 MHz for the second attenuation factor, and a third transitional frequency offset range of approximately −453.3333 MHZ to +453.3333 MHZ for the third attenuation factor.

Clause 43. The apparatus of any of clauses 39 to 40, where the first bandwidth ($\beta_1$) is approximately 480 MHZ, where the spectral mask for the mm Wave carrier signal of the first bandwidth ($\beta_1$) defines an in-band frequency offset range of approximately −234 MHz to +234 MHZ, a first transitional frequency offset range of approximately −266.6667 MHZ to +266.6667 MHZ for the first attenuation factor, a second transitional frequency offset range of approximately −600 MHZ to +600 MHZ for the second attenuation factor, and a third transitional frequency offset range of approximately −680 MHz to +680 MHz for the third attenuation factor.

Clause 44. The apparatus of any of clauses 39 to 40, where the first bandwidth ($\beta_1$) is approximately 640 MHZ, where the spectral mask for the mmWave carrier signal of the first bandwidth ($\beta_1$) defines an in-band frequency offset range of approximately −312 MHz to +312 MHz, a first transitional frequency offset range of approximately −355.5556 MHz to +355.5556 MHz for the first attenuation factor, a second transitional frequency offset range of approximately −800 MHZ to +800 MHZ for the second attenuation factor, and a third transitional frequency offset range of approximately −906.6667 MHZ to +906.6667 MHZ for the third attenuation factor.

Clause 45. The apparatus of any of clauses 39 to 40, where the first bandwidth ($\beta_1$) is approximately 960 MHZ, where the spectral mask for the mmWave carrier signal of the first bandwidth ($\beta_1$) defines an in-band frequency offset range of approximately −468 MHz to +468 MHZ, a first transitional frequency offset range of approximately −533.3333 MHZ to +533.3333 MHz for the first attenuation factor, a second transitional frequency offset range of approximately −1200 MHZ to +1200 MHZ for the second attenuation factor, and a third transitional frequency offset range of approximately −1360 MHz to +1360 MHz for the third attenuation factor.

Clause 46. The apparatus of any of clauses 33 to 45, further including means for transmitting the RF signal in accordance with a first data tone plan, where the first data tone plan defines a first set of data tones according to a second data tone plan for a second nominal carrier signal of a third bandwidth ($\beta_3$) and a ratio between the first bandwidth ($\beta_1$) and the third bandwidth ($\beta_3$).

Clause 47. The apparatus of clause 46, where the first set of data tones corresponds to the second data tone plan upclocked by the ratio between the first bandwidth ($\beta_1$) and the third bandwidth ($\beta_3$).

Clause 48. The apparatus of any of clauses 46 to 47, further including means for transmitting the RF signal in accordance with spectral flatness parameters associated with the second data tone plan.

Clause 49. One or more non-transitory computer-readable media having instructions for wireless communication by a wireless communication device stored thereon which, when executed by a processor of the wireless communication device, cause the wireless communication device to modulate a millimeter-wave (mmWave) carrier signal according to a baseband signal to generate a modulated mmWave carrier signal of a first bandwidth ($\beta_1$), and transmit a radio frequency (RF) signal associated with the modulated mmWave carrier signal in accordance with a first spectral mask for the mmWave carrier signal of the first bandwidth ($\beta_1$), where the first spectral mask defines an in-band frequency offset range, and multiple transitional frequency offset ranges, including a respective transitional frequency offset range for each of multiple attenuation factors, where for each of the multiple attenuation factors, the respective transitional frequency offset range corresponds to a transitional frequency offset range for that attenuation factor associated with a second spectral mask for a nominal carrier signal of a second bandwidth ($\beta_2$) scaled according to a ratio $S_\beta$ between the first bandwidth ($\beta_1$) and the second bandwidth ($\beta_2$), where a width of the in-band frequency offset range is wider than a width of an in-band frequency offset range of the second spectral mask for the nominal carrier signal scaled according to the ratio $S_\beta$.

Clause 50. The one or more non-transitory computer-readable media of clause 49, where a center frequency of the mmWave carrier signal is a frequency in a 60 GHz frequency band or a 45 GHz frequency band.

Clause 51. The one or more non-transitory computer-readable media of any of clauses 49 to 50, where a center frequency of the nominal carrier signal is a frequency in a sub-7 GHz frequency band.

Clause 52. The one or more non-transitory computer-readable media of clause 51, where the sub-7 GHz frequency band is a 2.4 GHz frequency band, a 5 GHZ frequency band, or a 6 GHz frequency band.

Clause 53. The one or more non-transitory computer-readable media of any of clauses 49 to 52, where the second spectral mask is an Institute of Electrical and Electronics Engineers (IEEE) 802.11ad-compliant spectral mask.

Clause 54. The one or more non-transitory computer-readable media of any of clauses 49 to 53, where the second bandwidth ($\beta_2$) is approximately 2.16 GHz.

Clause 55. The one or more non-transitory computer-readable media of clause 54, where the spectral mask for the nominal carrier signal of the second bandwidth ($\beta_2$) defines an in-band frequency offset range of approximately −940 MHz to +940 MHz, a first transitional frequency offset range of approximately −1200 MHz to +1200 MHz for a first attenuation factor, a second transitional frequency offset range of approximately −2700 MHz to +2700 MHz for a second attenuation factor, and a third transitional frequency offset range of approximately −3060 MHz to +3060 MHz for a third attenuation factor.

Clause 56. The one or more non-transitory computer-readable media of clause 55, where the first attenuation factor is approximately −17 dBr, the second attenuation factor is approximately −22 dBr, and the third attenuation factor is approximately −30 dBr.

Clause 57. The one or more non-transitory computer-readable media of any of clauses 55 to 56, where the first bandwidth ($\beta_1$) is approximately 160 MHZ, where the spectral mask for the mmWave carrier signal of the first bandwidth ($\beta_1$) defines an in-band frequency offset range of approximately −78 MHz to +78 MHz, a first transitional frequency offset range of approximately −88.8889 MHz to +88.8889 MHz for the first attenuation factor, a second transitional frequency offset range of approximately −200 MHz to +200 MHz for the second attenuation factor, and a third transitional frequency offset range of approximately −226.6667 MHZ to +226.6667 MHZ for the third attenuation factor.

Clause 58. The one or more non-transitory computer-readable media of any of clauses 55 to 56, where the first bandwidth ($\beta_1$) is approximately 320 MHZ, where the spectral mask for the mmWave carrier signal of the first bandwidth ($\beta_1$) defines an in-band frequency offset range of approximately −156 MHz to +156 MHZ, a first transitional frequency offset range of approximately −177.7778 MHz to +177.7778 MHZ for the first attenuation factor, a second transitional frequency offset range of approximately −400 MHZ to +400 MHz for the second attenuation factor, and a third transitional frequency offset range of approximately −453.3333 MHz to +453.3333 MHZ for the third attenuation factor.

Clause 59. The one or more non-transitory computer-readable media of any of clauses 55 to 56, where the first bandwidth ($\beta_1$) is approximately 480 MHZ, where the spectral mask for the mmWave carrier signal of the first bandwidth ($\beta_1$) defines an in-band frequency offset range of approximately −234 MHz to +234 MHZ, a first transitional frequency offset range of approximately −266.6667 MHZ to +266.6667 MHZ for the first attenuation factor, a second transitional frequency offset range of approximately −600 MHz to +600 MHz for the second attenuation factor, and a third transitional frequency offset range of approximately −680 MHz to +680 MHz for the third attenuation factor.

Clause 60. The one or more non-transitory computer-readable media of any of clauses 55 to 56, where the first bandwidth ($\beta_1$) is approximately 640 MHZ, where the spectral mask for the mmWave carrier signal of the first bandwidth ($\beta_1$) defines an in-band frequency offset range of approximately −312 MHz to +312 MHz, a first transitional frequency offset range of approximately −355.5556 MHz to +355.5556 MHZ for the first attenuation factor, a second transitional frequency offset range of approximately −800 MHZ to +800 MHz for the second attenuation factor, and a third transitional frequency offset range of approximately −906.6667 MHz to +906.6667 MHZ for the third attenuation factor.

Clause 61. The one or more non-transitory computer-readable media of any of clauses 55 to 56, where the first bandwidth ($\beta_1$) is approximately 960 MHZ, where the spectral mask for the mmWave carrier signal of the first bandwidth ($\beta_1$) defines an in-band frequency offset range of approximately −468 MHz to +468 MHz, a first transitional frequency offset range of approximately −533.3333 MHz to +533.3333 MHZ for the first attenuation factor, a second transitional frequency offset range of approximately −1200 MHz to +1200 MHz for the second attenuation factor, and a third transitional frequency offset range of approximately −1360 MHz to +1360 MHz for the third attenuation factor.

Clause 62. The one or more non-transitory computer-readable media of any of clauses 49 to 61, further having instructions for wireless communication by the wireless communication device stored thereon which, when executed by the processor of the wireless communication device, cause the wireless communication device to transmit the RF signal in accordance with a first data tone plan, where the first data tone plan defines a first set of data tones according to a second data tone plan for a second nominal carrier signal of a third bandwidth ($\beta_3$) and a ratio between the first bandwidth ($\beta_1$) and the third bandwidth ($\beta_3$).

Clause 63. The one or more non-transitory computer-readable media of clause 62, where the first set of data tones corresponds to the second data tone plan upclocked by the ratio between the first bandwidth ($\beta_1$) and the third bandwidth ($\beta_3$).

Clause 64. The one or more non-transitory computer-readable media of any of clauses 62 to 63, further having instructions for wireless communication by the wireless communication device stored thereon which, when executed by the processor of the wireless communication device, cause the wireless communication device to transmit the RF signal in accordance with spectral flatness parameters associated with the second data tone plan.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless communication device, comprising:
at least one memory; and
at least one processor communicatively coupled with the at least one memory, the at least one processor operable to cause the wireless communication device to:
modulate a millimeter-wave (mm Wave) carrier signal according to a baseband signal to generate a modulated mm Wave carrier signal of a first bandwidth ($\beta_1$); and
transmit a radio frequency (RF) signal associated with the modulated mm Wave carrier signal in accordance with a first spectral mask for the mm Wave carrier signal of the first bandwidth ($\beta_1$), wherein the first spectral mask defines:
an in-band frequency offset range; and
multiple transitional frequency offset ranges, including a respective transitional frequency offset range for each of multiple attenuation factors, wherein for each of the multiple attenuation factors, the respective transitional frequency offset range corresponds to a transitional frequency offset range for that attenuation factor associated with a second spectral mask for a nominal carrier signal of a second bandwidth ($\beta_2$) scaled according to a ratio $S_\beta$ between the first bandwidth ($\beta_1$) and the second bandwidth ($\beta_2$);
wherein a width of the in-band frequency offset range is wider than a width of an in-band frequency offset range of the second spectral mask for the nominal carrier signal scaled according to the ratio $S_\beta$.

2. The wireless communication device of claim 1, wherein a center frequency of the mmWave carrier signal is a frequency in a 60 GHz frequency band or a 45 GHz frequency band.

3. The wireless communication device of claim 1, wherein the second spectral mask is an Institute of Electrical and Electronics Engineers (IEEE) 802.11ad-compliant spectral mask.

4. The wireless communication device of claim 1, wherein the second bandwidth ($\beta_2$) is 2.16 GHz.

5. The wireless communication device of claim 4, wherein the spectral mask for the nominal carrier signal of the second bandwidth ($\beta_2$) defines:
- an in-band frequency offset range of −940 MHz to +940 MHz;
- a first transitional frequency offset range of −1200 MHz to +1200 MHZ for a first attenuation factor;
- a second transitional frequency offset range of −2700 MHz to +2700 MHz for a second attenuation factor; and
- a third transitional frequency offset range of −3060 MHz to +3060 MHz for a third attenuation factor.

6. The wireless communication device of claim 5, wherein the first attenuation factor is −17 dBr, the second attenuation factor is −22 dBr, and the third attenuation factor is −30 dBr.

7. The wireless communication device of claim 5, wherein the first bandwidth ($\beta_1$) is 160 MHz, wherein the spectral mask for the mmWave carrier signal of the first bandwidth ($\beta_1$) defines:
- an in-band frequency offset range of −78 MHz to +78 MHz;
- a first transitional frequency offset range of −88.8889 MHz to +88.8889 MHz for the first attenuation factor;
- a second transitional frequency offset range of −200 MHz to +200 MHz for the second attenuation factor; and
- a third transitional frequency offset range of −226.6667 MHz to +226.6667 MHz for the third attenuation factor.

8. The wireless communication device of claim 5, wherein the first bandwidth ($\beta_1$) is 320 MHz, wherein the spectral mask for the mmWave carrier signal of the first bandwidth ($\beta_1$) defines:
- an in-band frequency offset range of −156 MHz to +156 MHz;
- a first transitional frequency offset range of −177.7778 MHz to +177.7778 MHz for the first attenuation factor;
- a second transitional frequency offset range of −400 MHz to +400 MHz for the second attenuation factor; and
- a third transitional frequency offset range of −453.3333 MHz to +453.3333 MHz for the third attenuation factor.

9. The wireless communication device of claim 5, wherein the first bandwidth ($\beta_1$) is 480 MHz, wherein the spectral mask for the mmWave carrier signal of the first bandwidth ($\beta_1$) defines:
- an in-band frequency offset range of −234 MHz to +234 MHZ;
- a first transitional frequency offset range of −266.6667 MHz to +266.6667 MHz for the first attenuation factor;
- a second transitional frequency offset range of −600 MHz to +600 MHZ for the second attenuation factor; and
- a third transitional frequency offset range of −680 MHz to +680 MHz for the third attenuation factor.

10. The wireless communication device of claim 5, wherein the first bandwidth ($\beta_1$) is 640 MHz, wherein the spectral mask for the mmWave carrier signal of the first bandwidth ($\beta_1$) defines:
- an in-band frequency offset range of −312 MHz to +312 MHz;
- a first transitional frequency offset range of −355.5556 MHz to +355.5556 MHz for the first attenuation factor;
- a second transitional frequency offset range of −800 MHz to +800 MHz for the second attenuation factor; and
- a third transitional frequency offset range of −906.6667 MHz to +906.6667 MHz for the third attenuation factor.

11. The wireless communication device of claim 5, wherein the first bandwidth ($\beta_1$) is 960 MHz, wherein the spectral mask for the mmWave carrier signal of the first bandwidth ($\beta_1$) defines:
- an in-band frequency offset range of −468 MHz to +468 MHZ;
- a first transitional frequency offset range of −533.3333 MHz to +533.3333 MHz for the first attenuation factor;
- a second transitional frequency offset range of −1200 MHz to +1200 MHz for the second attenuation factor; and
- a third transitional frequency offset range of −1360 MHz to +1360 MHz for the third attenuation factor.

12. The wireless communication device of claim 1, wherein the at least one processor is operable to cause the wireless communication device to transmit the RF signal in accordance with a first data tone plan, and wherein the first data tone plan defines a first set of data tones according to a second data tone plan for a second nominal carrier signal of a third bandwidth ($\beta_3$) and a ratio between the first bandwidth ($\beta_1$) and the third bandwidth ($\beta_3$).

13. The wireless communication device of claim 12, wherein the first set of data tones corresponds to the second data tone plan upclocked by the ratio between the first bandwidth ($\beta_1$) and the third bandwidth ($\beta_3$).

14. The wireless communication device of claim 12, wherein the at least one processor is operable to cause the wireless communication device to transmit the RF signal in accordance with spectral flatness parameters associated with the second data tone plan.

15. A method for wireless communication by a wireless communication device, the method comprising:
- modulating a millimeter-wave (mmWave) carrier signal according to a baseband signal to generate a modulated mmWave carrier signal of a first bandwidth ($\beta_1$); and
- transmitting a radio frequency (RF) signal associated with the modulated mmWave carrier signal in accordance with a first spectral mask for the mmWave carrier signal of the first bandwidth ($\beta_1$), wherein the first spectral mask defines:
  - an in-band frequency offset range; and
  - multiple transitional frequency offset ranges, including a respective transitional frequency offset range for each of multiple attenuation factors, wherein for each of the multiple attenuation factors, the respective transitional frequency offset range corresponds to a transitional frequency offset range for that attenuation factor associated with a second spectral mask for a nominal carrier signal of a second bandwidth ($\beta_2$) scaled according to a ratio $S_\beta$ between the first bandwidth ($\beta_1$) and the second bandwidth ($\beta_2$);
- wherein a width of the in-band frequency offset range is wider than a width of an in-band frequency offset range of the second spectral mask for the nominal carrier signal scaled according to the ratio $S_\beta$.

16. The method of claim 15, wherein a center frequency of the mm Wave carrier signal is a frequency in a 60 GHz frequency band or a 45 GHz frequency band.

17. The method of claim 15, wherein a center frequency of the nominal carrier signal is a frequency in a sub-7 GHz frequency band.

18. The method of claim 17, wherein the sub-7 GHz frequency band is a 2.4 GHz frequency band, a 5 GHz frequency band, or a 6 GHz frequency band.

19. The method of claim 15, wherein the second spectral mask is an Institute of Electrical and Electronics Engineers (IEEE) 802.11ad-compliant spectral mask.

20. The method of claim 15, wherein the second bandwidth ($\beta_2$) is 2.16 GHz.

21. The method of claim 20, wherein the spectral mask for the nominal carrier signal of the second bandwidth ($\beta_2$) defines:
an in-band frequency offset range of −940 MHz to +940 MHz;
a first transitional frequency offset range of −1200 MHz to +1200 MHz for a first attenuation factor;
a second transitional frequency offset range of −2700 MHz to +2700 MHz for a second attenuation factor; and
a third transitional frequency offset range of −3060 MHz to +3060 MHz for a third attenuation factor.

22. The method of claim 21, wherein the first attenuation factor is −17 dBr, the second attenuation factor is −22 dBr, and the third attenuation factor is −30 dBr.

23. The method of claim 15, further comprising transmitting the RF signal in accordance with a first data tone plan, wherein the first data tone plan defines a first set of data tones according to a second data tone plan for a second nominal carrier signal of a third bandwidth ($\beta_3$) and a ratio between the first bandwidth ($\beta_1$) and the third bandwidth ($\beta_3$).

24. The method of claim 23, wherein the first set of data tones corresponds to the second data tone plan upclocked by the ratio between the first bandwidth ($\beta_1$) and the third bandwidth ($\beta_3$).

25. The method of claim 23, further comprising transmitting the RF signal in accordance with spectral flatness parameters associated with the second data tone plan.

* * * * *